July 13, 1965

A. L. BROWN 3,194,992

ELECTRODYNAMIC TYPE VIBRATION GENERATOR

Filed June 14, 1962

INVENTOR
ALLEN L. BROWN
BY
Byerly, Townsend, Watson & Churchill
ATTORNEYS.

United States Patent Office 3,194,992
Patented July 13, 1965

3,194,992
ELECTRODYNAMIC TYPE VIBRATION
GENERATOR
Allen L. Brown, New Haven, Conn., assignor to Textron Electronics, Inc., Providence, R.I., a corporation of Delaware
Filed June 14, 1962, Ser. No. 202,573
7 Claims. (Cl. 310—27)

The present invention relates to an armature assembly for an electrodynamic vibration exciter.

Present day research and development groups are making more and more use of vibration testing for proving and improving the ruggedness of their products. The quest of those responsible for the manufacture of vibration exciting equipment has been constantly to achieve greater efficiency with respect to force generation, lighter and more economical equipment, and generally greater capability in reproducing desired excitation characteristics.

Numerous factors contribute towards limiting the usefulness or efficiency of equipment currently available. Ideally the airgap of an electrodynamic exciter should be occupied only by material capable of contributing to force generation. However, it has been necessary heretofore to include in the gap strap clamps and coil rings and the like for securing the driving coil to the exciter table structure. This reduces the efficiency.

Heat is another factor. While operating, the flow of electric current through the driving coil generates heat. This is true of all electrodynamic equipment, and the maximum permissible temperature rise sets a limit on the maximum current which the coil may carry. This, in turn, limits the output power of the equipment.

The present invention has for an object to reduce the volume of non-coil or non-force generating material in the airgap and thereby improve the operating efficiency.

A further object is to provide for improved heat dissipation from the coil to increase its current rating.

The foregoing objects are attained in accordance with the invention generally by providing a connection between the table structure and the driving coil which connection is formed by bonds of a cured thermosetting resin which are located such that all of the driving forces between coil and table must be transmitted therethrough in a shear stress inducing mode. That is, the bonds are so located that the driving forces do not place the resin under either tension or compression, at least to any significant degree.

Figure 1:
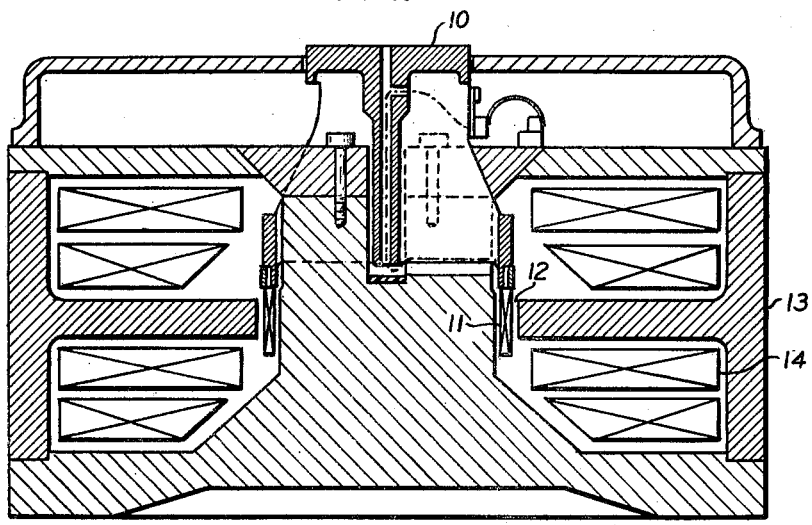
Figure 2:
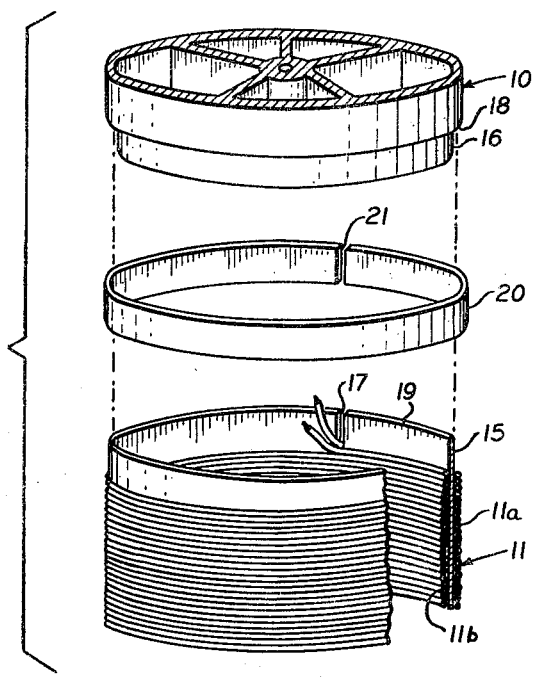

It is believed that the invention will be better understood after reading the following detailed description of an exemplary embodiment thereof with reference to the appended drawings in which:

FIGURE 1 is a diagrammatic cutaway view showing the principal components of a vibration exciter, and FIGURE 2 is an enlarged exploded view of the driving coil and lower end of the table structure illustrating the details of the invention.

Referring now to FIGURE 1 it will be observed that an electrodynamic vibration exciter comprises essentially a table structure 10 joined to a driving coil 11 which is operatively positioned in an annular airgap 12 formed by the field structure 13 which, in turn, is energized by the field windings 14. Not shown are the usual connections for positioning and supporting the table structure 10 so that the coil 11 moves in the axial direction in the airgap, thereby driving the table structure.

In operation the field windings 14 are energized from a direct current source (not shown) while appropriate excitation signals are supplied to coil 11. By suitably controlling the signals supplied to coil 11 in any well known manner it is possible to develop vibratory forces as desired.

The present invention is concerned with the construction of the driving coil and its connection to the table structure. As seen in FIGURE 2, the driving coil 11 consists of a winding having part of its turns disposed along the outer (at 11a) and part along the inner (at 11b) longitudinal surfaces of a hollow cylindrical core member 15. The core member 15 is formed at present preferably from thin sheet metal such as steel or titanium but it may also be formed from reinforced plastic or other low permeability high strength material.

A portion of the core member 15 extends beyond the windings and is arranged to telescope over a cylindrical portion or skirt 16 of reduced diameter at the bottom of the table structure 10. For manufacturing convenience and economy the core member 15 is split longitudinally at 17. Due to the reduction in diameter of the portion 16 the table structure presents a radially extending shoulder 18 to the end 19 of the core member 15. A reinforcing metal band 20 split at 21 (also for convenience) is disposed over the exposed end of the core member 15 so as to take up the space between the shoulder 18 and the top of the part 11a of the coil 11. The split or slot 21 in band 20 may be aligned with the slot 17 in the core member, and a slot (not shown) may be provided in skirt 16 to accommodate the lead-in wires to the coil 11.

All of the components are bonded together in telescoped relationship by means of a resinous adhesive medium in a manner which can best be explained in terms of the procedure for making the assembly.

Preferably, the core member 15 is initially prepared by coating both sides with a very thin layer of insulating material. A liquid resinous adhesive is required to bond the components together and it is convenient to use the same material suitably thinned for applying the coating to the core member 15. Although other materials are available, it has been found that a thermosetting liquid adhesive such as the modified epoxy resin based product sold by Minnesota Mining and Manufacturing Company and identified as "3M Adhesive, EC–1386" is quite satisfactory. The most important characteristics determining the choice of resin is that it must: (a) have high shear strength at the anticipated service temperature; (b) be a low viscosity one part system for easy handling; and (c) be thermosetting to maximum strength at temperatures not exceeding that which would degrade the insulation on the wires of the driving coil.

Using the 3M Adhesive, EC–1386 it can be thinned or reduced 1:1 with lacquer thinner. After coating the core member 15 with a very thin layer, say on the order of 0.0005 inch, the resin is cured for 30 minutes at 200° F.

Starting with an appropriate mandrel or form (not shown) the wire for the coil, an epoxy insulated magnet wire, is wound thereon to produce the inner layer 11b (see FIGURE 2). The wire is continuously coated with the liquid resin adhesive as it is being wound. Next the previously prepared core member or plate is wrapped around the part of the winding already in place being careful to position it generally as shown in FIGURE 2. A temporary band or clamp, if needed, is now applied to hold the core member in place. Bringing the end of the wire from the under layer of the winding up through the slot 17 in the core member the winding is continued on its outer surface. The liquid resin is applied to the wire also during this last winding step. At a convenient point the temporary clamps are removed. After the winding is completed and the wire ends secured in any suitable manner, the liquid resin on the sub-assembly thus produced is cured for 30 minutes at 200° F. This will bond the individual turns of the coil to each other and to the core member.

After the coil sub-assembly is cured it is permitted to cool and removed from the winding form or mandrel. Now, with liquid resin adhesive applied between all contacting surfaces the parts shown in FIGURE 2 are assembled. The resulting assembly is subjected to a preliminary curing cycle of 30 minutes at 200° F. followed by a final cure for 1 hour at 350° F.

It has been assumed without making specific mention that the metal parts were appropriately prepared initially by degreasing and so forth to ensure effective bonding to the resin medium.

The foregoing construction procedure has been used successfully in producing a table assembly having a winding about 3½ inches in diameter which is capable of developing forces in excess of 150 pounds vector. An experimental unit was successfully subjected to an endurance test of 90 hours continuous operation at 180 pounds force.

For the 3½ inch diameter winding a core member of .003 inch thick stainless steel was employed. The reinforcing ring was approximately .045 inch thick and made of aluminum. Other light weight materials such as magnesium will prove satisfactory. The core member was 1¾ inches long with a little less than ⅜ inch exposed for bonding to the table structure.

A glass fiber reinforced epoxy resin core has been used successfully in place of the metal core but it suffers from the disadvantage of becoming brittle and rigid during the curing of the coil winding so that it is difficult to assemble to the table structure. It is also unavailable in thicknesses much below 0.012 inch and provides a space problem as compared with .003 inch thick steel.

One final disadvantage of the resin core, or more important, a principal advantage of the metal core is that the latter acts as a thermal conductor to conduct heat from the coil winding to the camparatively large metal mass of the table structure while the former is a poor thermal conductor. Thus, with the metal core the table structure functions as a heat sink to help cool the windings of the driving coil.

It should be apparent that the very thin sheet which makes up the core for the coil presents a very small volume to the air gap. Nevertheless, an extremely strong and rigid coil assembly is produced.

The preliminary coating of the core plate or member is another manufacturing expedient to ensure against the development of a short circuit between the coil winding and the core during winding of the coil in the event the insulation on the wire should be defective or become damaged. On the other hand, if a short is detected during winding it is indicative of gross or major damage to the insulation which can be readily located and corrected before the entire winding is completed.

From the foregoing it will be seen that all of the resin bonds are located on surfaces parallel to the armature axis so that the driving forces can develop only shearing stresses therein. This takes advantage of the comparatively high shear strength of the thermosetting resins, particularly the epoxies and enables the production of efficient economical units.

The invention has, thus, been described with reference to a presently preferred embodiment thereof. It is to be understood that changes may be made as will appear to those skilled in the art without departing from the true spirit of the invention as defined in the appended claims. Particularly, it should be understood that the invention is applicable to table assemblies both larger and smaller than the 3½ inch table described in detail herein.

What is claimed is:

1. An armature assembly for a vibration exciter comprising a table structure and a driving coil assembly, said coil assembly including a winding disposed in part along the outer and in part along the inner longitudinal surfaces of a hollow cylindrical core member and bonded thereto by a resinous adhesive medium, said core member having an exposed portion joined to said table structure coaxially with the table axis, the arrangement being such that driving forces are transmitted through the adhesive medium in a shear stress inducing mode from the winding to the table.

2. An armature assembly for a vibration exciter comprising a table structure and a driving coil assembly, said coil assembly including a winding disposed in part along the outer and in part along the inner longitudinal surfaces of a hollow cylindrical core member and bonded thereto by a resinous adhesive medium, said core member having an exposed end in telescoping relation to a cylindrical portion of said table structure and secured thereto by a resinuous adhesive medium.

3. An armature assembly according to claim 2, wherein said core member is composed of thin sheet steel.

4. An armature assembly according to claim 3, wherein said steel sheet in the form of a hollow cylinder contains a longitudinal split therein.

5. An armature assembly according to claim 2, wherein said core member is composed of a hollow split cylinder of thin sheet steel having its exposed end telescoped over the cylindrical portion of the table structure which portion is of reduced diameter adjacent the bottom thereof such that the table structure presents a radially extending shoulder to the end of said core member, and a reinforcing split metal band is disposed over the exposed end of said core member bonded thereto by a resinous adhesive medium.

6. An armature assembly for a vibration exciter comprising a table structure with a cylindrical portion in telescoping relation to one end of a hollow cylindrical core member, the other end of said core member carrying a driving coil winding on at least one of its longitudinal surfaces, said winding and core member being secured respectively to said core member and to said table structure solely by means of a resinous adhesive medium.

7. An armature assembly for a vibration exciter comprising a table structure and a driving coil wherein the connection therebetween includes concentric members secured together solely by means of a resinous adhesive medium, said members being coaxial with the table axis such that the resinous medium is subjected only to shear stress when the assembly is placed in operation.

References Cited by the Examiner

UNITED STATES PATENTS

| 1,962,012 | 6/34 | Grossman | 179—115.5 |
| 2,289,961 | 7/42 | Hancock | 310—27 |
| 2,781,461 | 2/57 | Booth et al. | 310—27 |
| 2,846,598 | 8/58 | Zerigan | 310—27 |

MILTON O. HIRSHFIELD, *Primary Examiner.*